J. A. CECIL.
WIRE STRETCHER.
APPLICATION FILED SEPT. 30, 1916.

1,209,556.

Patented Dec. 19, 1916.

Inventor
J. A. Cecil.

By Victor J. Evans.
Attorney

Witness
Fredk L. Fox

UNITED STATES PATENT OFFICE.

JOSEPH A. CECIL, OF DOTT, WEST VIRGINIA.

WIRE-STRETCHER.

1,209,556. Specification of Letters Patent. Patented Dec. 19, 1916.

Application filed September 30, 1916. Serial No. 123,117.

*To all whom it may concern:*

Be it known that I, JOSEPH A. CECIL, a citizen of the United States, residing at Dott, in the county of Mercer and State of West Virginia, have invented new and useful Improvements in Wire-Stretchers, of which the following is a specification.

This invention aims in the production of a combined wire stretcher and carrier which is simple in construction, durable in use, and adapted to enable fence wire to be readily unwound and distributed for fence building and capable of readily stretching the wire to the desired tension.

With the above and other objects in view the improvement resides in the construction, combination and arrangement of parts set forth in the following specification and falling within the scope of the appended claims.

Figure 1:
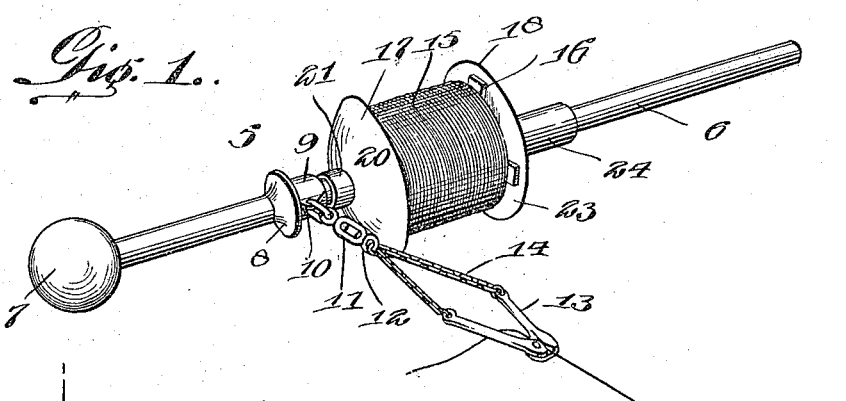
Figure 2:
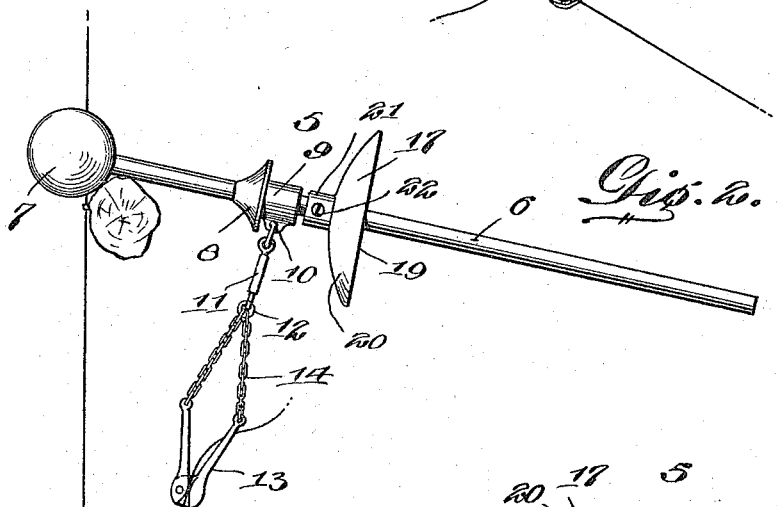
Figure 3:
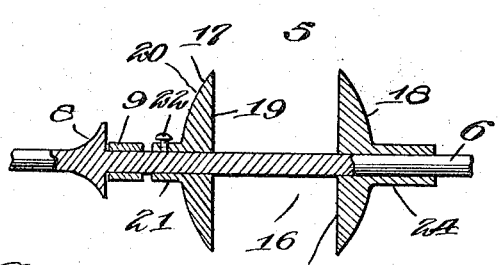

In the drawing, Figure 1 is a perspective view of the device constructed in accordance with my invention, Fig. 2 is a plan view with the wire removed therefrom and illustrating the device as being utilized as a stretcher, and Fig. 3 is a detail sectional view clearly illustrating the manner of forming the rod or staff with a spool.

Referring more particularly to the accompanying drawing, 5 denotes my combined wire stretcher and carrier generally which may be constructed of any suitable material and constitutes a rod or staff 6 of cylindrical form provided at one end with a cylindrical knob or head 7. Formed integral with said rod at a point adjacent the knob 7 is a stop 8. Loosely mounted on the said rod or staff at a point in adjacent relation with respect to the stop 8 is a collar 9 provided on its outer circumference with an enlargement 10 to which is connected a swivel 11. The eye 12, constituting the swivel, has connected therewith a wire grip 13 through the medium of flexible chains 14. The function for so connecting this grip to the collar will be hereinafter more fully explained as the description of the invention is proceeded with.

The chief characteristic of this invention is to adapt the same as both a wire carrier and stretcher and to this end I have shown a reel or wire 15 rotatably mounted on the spool 16 of said rod. This spool is formed by adjustably mounting on the rod a pair of spaced disks 17 and 18 respectively. The disk 17 is provided with a confronting flat face 19 and a convex face 20, the latter having formed thereon a collar 21. Adjustably mounted therein is a set screw 22 tending to rotate this disk 17 in adjusted position. The other of said disks or rather the disk 18, is likewise provided with a confronting flat face 23 and a convexed outer face provided thereon with a sleeve or hand grip 24. The latter referred to disk 18 is at all times loosely mounted on the rod or staff 6 for both a sliding and rotary movement in order that the same may not only serve as forming a portion of the spool 16 but further to permit of such being utilized as a hand guard in order that the hand of the operator may be properly shielded against any damage due to the fact that the operator grasps the hand grip 24 and holds the disk 18 snugly against or in adjacent relation with respect to the reel of wire 15.

In the building of wire fences, the reel of wire 15 is duly placed on the spool 16, the disk 18 adjusted against one end of the reel of wire and as the wire is unwound from the reel the same is carried over the collar 9 and connected with the grip 13, and it is obvious that this wire is connected at its terminal to one of the posts or the like object constituting the fence structure. This operation is continued until the wire has been properly tensioned and the reel of wire 15 is exhausted. The device by being provided with the swiveled wire grip 13 will permit of the turning of the rod 16 at any desired angle without breaking or twisting the strands of wire when such device is being employed as a wire stretcher. It is further obvious that by the collar 19 being confined between the stop 8 and the collar 22 will guard against any undue opposite movements of the collar with respect to said rod.

From the above description, taken in connection with the accompanying drawing, the simplicity of the device, as well as the advantages thereof will, it is thought, be perfectly apparent to those skilled in the art to which such invention appertains without further detailed description.

Having thus described the invention what I claim is:

1. A combined wire stretcher and wire carrier embodying a rod, a wire grip loosely mounted on said rod, a spool for holding the reel of wire on said rod, said spool including an adjustable disk and a loosely mounted disk, the latter mentioned disk being provided with a hand grip and serving as a shield.

3. A combined wire stretcher and wire carrier embodying a rod, a wire grip loosely mounted on said rod, a spool for holding the reel of wire on said rod, said spool including an adjustable disk and a loosely mounted disk, the latter mentioned disk being provided with a hand grip and serving as a shield, and a stop formed integral with the rod for limiting the movement of the wire grip in one direction, the adjustable disk serving to prevent a movement of the grip in the opposite direction.

3. A combined wire stretcher and wire carrier embodying a rod, a collar loosely mounted on said rod, a wire grip swiveled to said collar, a spool for holding the reel of wire on said rod, said spool including an adjustable disk and a loosely mounted disk, the latter mentioned disk being provided with a hand grip and serving as a shield, and a stop formed integral with the rod for limiting the movement of the collar in one direction, the adjustable disk serving to prevent a movement of the collar in the opposite direction.

In testimony whereof I affix my signature.

JOSEPH A. CECIL.

Copies of this patent may be obtained for five cents each, by addressing the "Commissioner of Patents, Washington, D. C."